Sept. 30, 1941.          C. E. WILLIAMS                    2,257,320
                    DIRECTION FINDING SYSTEM
                Filed Nov. 6, 1937           3 Sheets—Sheet 1

INVENTOR
CHARLES E. WILLIAMS
BY Paul Bhien
ATTORNEY

Sept. 30, 1941.   C. E. WILLIAMS   2,257,320
DIRECTION FINDING SYSTEM
Filed Nov. 6, 1937   3 Sheets-Sheet 3

INVENTOR
CHARLES E. WILLIAMS
BY Paul Bliven
ATTORNEY

Patented Sept. 30, 1941

2,257,320

UNITED STATES PATENT OFFICE 2,257,320

DIRECTION FINDING SYSTEM

Charles E. Williams, Seattle, Wash.

Application November 6, 1937, Serial No. 173,204

3 Claims. (Cl. 250—11)

The present invention relates to beacon direction finding systems and in particular to radio beacon direction finding systems in which a beam or beams modulated with different characteristics, are used to convey to a craft having a suitable receiver some indication of its position.

In the prior art there has been used radio beams which have been held in a fixed position and in which several related beams have each had a different characteristic so that as the craft intercepting these beams would wander from one beam to another it would encounter various characteristics.

It is an object of the present invention to provide a single beam which periodically sweeps a desired angle and which has impressed on it signals of a particular character as the beam periodically passes through a particular position.

Another object of the present invention is to provide one or more beams which will periodically sweep any desired solid angle and which beams have impressed on them signals of a particular character as the beams periodically pass through a particular position.

Another object of the present invention is to so design a vibrating reed indicator that it will indicate the direction of reception from two or more stations at the same time whereby a triangulation on the two or more stations may be had to determine the position of the point of reception.

Another object of the present invention is to arrange the reeds in a vibrating reed indicator about a circumference so that their relative positions will be direct indications of the angles which they are to indicate.

Another object of the present invention is to provide means whereby a continuous indication of direction may be obtained in a simple manner.

Another object of the present invention is the operation of a number of radio beacons in the same general locality on the same carrier frequency.

Another object of the present invention is the operation of a plurality of beams at one transmitting station and on one carrier frequency, and the provision in a craft at a remote point of a single receiver operating a plurality of indicators whereby there will simultaneously be indicated the azimuth and angle of altitude of the craft with respect to the transmitting station.

Another object of the present invention is the operation of a plurality of radio beacons at different places in the same general locality on the same carrier frequency, and the provision in a craft at a remote point of a single receiver operating a plurality of indicators whereby there will simultaneously be indicated the angular direction of reception from a plurality of said stations in order that the rectangular coordinates of said receiver with respect to said stations may be determined.

The broad objects of the invention are obtained: by providing a directional antenna whose directivity is more or less sharply defined, depending upon the needs of each installation; by so mounting said antenna that the beam therefrom is periodically swept through a series of particular positions to form any desired plane or solid angle such as a complete ring, hemisphere, or even sphere, that is, the beam will have passed over or filled all of such figure; by utilizing a group of tone-frequency generators, a certain one of said generators modulating the beam when the beam is periodically in each particular position; and by providing in a craft at a remote point, a receiver and tone-frequency indicators such as a group of reeds each resonant to one of the modulating frequencies so that vibration of any one of the reeds will indicate the location in which reception is being had relative to the beam positions.

The term "beam," as used herein, preferably refers to a radio beam but it is also intended to refer to other beams such as infra-red or light beams. The characteristic or signal impressed on the beam is preferably of tone, or audible, frequency, but it may be of any other form which may be varied and the variations identified in the output of a receiver or receivers.

The specific means which applicant has invented to accomplish these objects is diagrammatically shown in the accompanying drawings in which.

Figure 1:
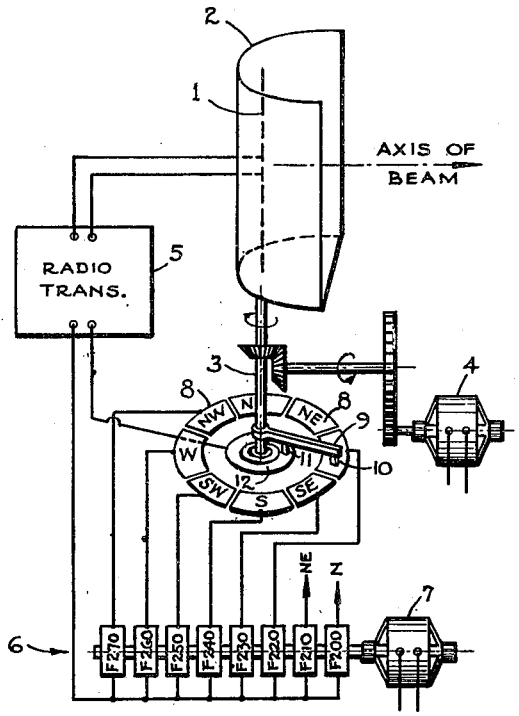
Figure 1 is a schematic showing of a single radio beam antenna arranged to radiate in a single plane, with the desired means for modulating the beam.

Referring to Figure 1, there is shown a directional beam antenna 1 with appropriate reflector 2. The antenna and reflector are mounted for rotation on the shaft 3, which shaft is rotated through appropriate gearing by the motor 4. The radiation pattern produced by the antenna and reflector may be of any desired form that will effectively sweep the area in which it is desired to obtain directional bearings. For example, if bearings are to be furnished over greater distances at low angles than at high angles, it will be desirable to concentrate the radiation in the lower angle, and to radiate only sufficient energy in the higher angles to give satisfactory results at close range. Radio transmitter 5 supplies power to antenna 1. A group of tone-frequency generators are shown at 6 and driven by motor 7. These generators may be constructed in accordance with the disclosure found in the patent to Laurens Hammond Number 1,956,350 granted April 24, 1934. These generators, for the purpose of illustration, are shown as generating frequencies from 200 to 270 per second differing by steps of 10. The output of these generators is utilized to modulate the transmitter 5. Each of the generators is connected to one of the commutators 8. Secured to the shaft 3 is the arm 9 which carries a brush 10 for contacting the commutators 8. The brush 10 is connected to the transmitter 5 through the brush 11 and slip ring 12. The number of different modulating frequencies may vary from one to infinity but for practical purposes it would be not less than the number shown in the drawing.

With the transmitter properly adjusted and energized, the motor 7 driving the tone-frequency generators, and the beam being rotated by the motor 4 turning the shaft 3 and reflector 2, the arm 9 will revolve with the shaft 3 and carry the brush 10 into contact with each of the commutators 8 in turn, to connect sequentially through the brush 11 and slip ring 12 each of the generators to the transmitter 5, and to modulate the transmitter and beam with a particular frequency while the beam is in a particular position.

Figure 2:
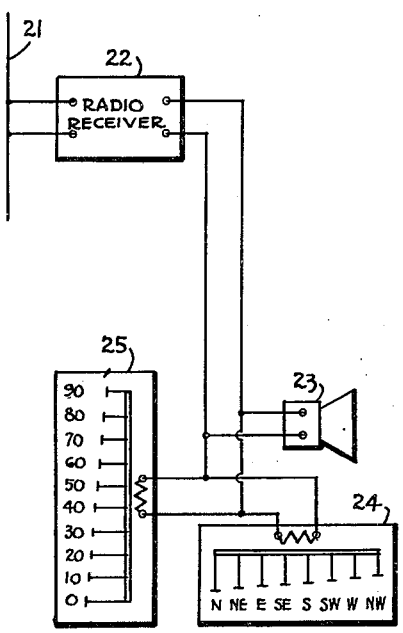
Figure 2 shows a receiving system for detecting at a remote point and indicating the relative frequency of a signal which was transmitted by an apparatus such as shown in Figure 1.

Figure 2 shows a receiving system for detecting and indicating at a remote point the relative frequency of a signal which was transmitted by an apparatus such as shown in Figure 1. The antenna 21 is coupled to the receiver 22 which has connected to its output terminals the loud speaker 23 an in parallel connection the reed frequency-indicators 24 and 25. These indicators may be of a common and well-known construction, such as shown in Bulletin 1415 of the James G. Biddle Company of Philadelphia, Pennsylvania. The frequencies to which the reeds in the indicator 24 are responsive, are identical to the frequencies of the generator group 6.

As the beam emitted by antenna 1 passes over the receiving antenna 21, the receiver being properly adjusted for the reception of the transmitted carrier frequency, a tone frequency will be produced by the loud speaker 23 and particularly indicated by one of the reeds in the indicator 24. By proper preagreement this particularly indicated frequency will be a determination of the directional relationship existing between the transmitting station and the receiving station. As the receiving system moves around a transmitting system such as shown in Figure 1, the various reeds in 24 will take up and stop vibration to give at all times an indication of the direction of the receiver with respect to the transmitting station. By arranging the reeds so that adjacent ones will be sequentially actuated as the receiver passes around the transmitter, there will be, at all times, a visual indication of the relative angular position of the receiver with respect to the transmitter.

Figure 3:
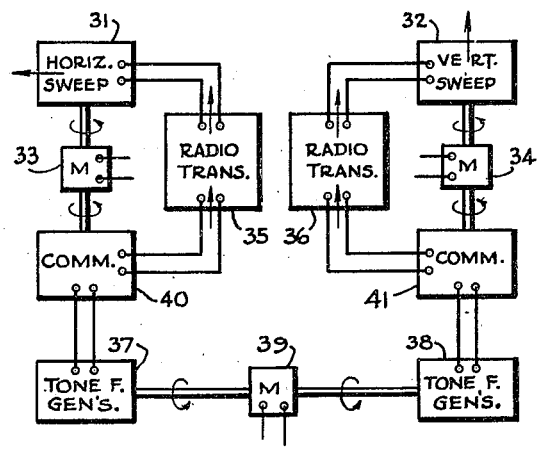
Figure 3 is a block diagram of a transmitting station having two beams, each of which is adapted to sweep in one degree of freedom, and the two beams angularly coordinating a solid angle.

Figure 3 is a block diagram of a transmitting station having two beams each of which is adapted to sweep in one degree of freedom, and the two beams angularly coordinating a solid angle whereby a receiving station at a remote point may determine its angle of azimuth and altitude with respect to the transmitting station. This transmitting station utilizes two directional beam radiators 31 and 32 which are similar to the antenna 1 and reflector 2 shown in Figure 1. Rotating the antenna 31 and 32 are the motors 33 and 34 respectively. Antenna 31 and associated reflector are designed to produce a beam with an elliptical cross section having its major axis extending from the horizon to the vertical. This antenna is designated as a horizontal, or azimuth, radiator. When this antenna is rotated about a vertical axis, the beam will in the course of one revolution sweep the entire hemisphere. At the same time the antenna 32 and its associated reflector produces a beam of elliptical cross section having its minor axis parallel to its direction of rotation about a horizontal axis. The antenna 32 is designated as a vertical, or altitude, radiator. Radio transmitters 35 and 36 supply power to the antenna 31 and 32. Each of the tone-frequency generators 37 and 38 driven by the motor 39 is of the same construction as the one shown at 6 in Figure 1. Each of these generator groups is connected through a series of commutators 40 and 41 to their respective transmitter. Each series of these commutators may be similar to the series shown in Figure 1.

As the beam from the antenna 31 rotates about its vertical axis it will be modulated differently at different positions. The beam from the antenna 32 will be modulated by a series of frequencies different than those used to modulate the beam from the antenna 31. Thus at a remote point within the range of the two beams there will be received by an appropriately adjusted receiver, two different tone frequencies. These frequencies will be an indication of the azimuth and angle of altitude of the remote point in relation to the transmitting antennae. Such a receiving station would be similar to that shown in Figure 2 and would be provided with two sets of reeds such as shown at 24 and 25. One set, such as 24, would be used for indicating the angle of azimuth and the other, such as 25, would be used for indicating the angle of altitude.

The commutator for the vertical radiator may have its individual segments omitted from that part of the circumference which would cause the antenna to radiate against the earth. The number of tone-frequency generators would be limited accordingly. As above described the transmitter permits determination at a distant point, of azimuth throughout 360 degrees of arc. If desired this azimuth may be restricted to a much smaller arc, also the major axis of the beam may be reduced. The vertical transmitter 32 has also been described as producing a beam having a major and minor axis. For practical operation the major axis of this beam would probably subtend an angle of less than 90 degrees. Consequently if an indication of the angle of altitude is desired throughout 360 degrees of azimuth it would be necessary to employ additional beams of a similar form, each rotating about a different horizontal axis. However, the same transmitter 36 and its associated group of tone-frequency generators 38 may be employed common to the several vertical beams.

Figure 4:
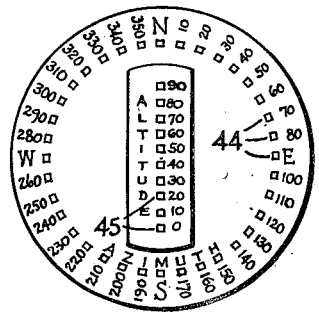
Figure 4 shows an arrangement of reeds in an indicator of both azimuth and angle of altitude.

Figure 4 shows an indicator which indicates the angle of azimuth by arranging a group of reeds 44 about a circumference. Opposite each reed may be placed an indicia of azimuth such as degrees from a reference point which may be taken as north, or the points of the compass may be used. The reading may be that of the direction of transmission or of reception. On a diameter of the circumference may be placed another group of reeds 45 to indicate the angle of altitude. This angle, likewise, may be either that of transmission or reception. Also, opposite each of these reeds may be placed an indicia of altitude. Thus, as a particular tone-frequency is received from an antenna such as 31 one of the reeds 44 will respond and give an indication of the location of the receiving station relative to the transmitting station in azimuth, and as a tone is received from an antenna such as 32 one of the reeds 45 will likewise respond and indicate the location in angle of altitude of the receiving station with respect to the transmitter.

Figure 5:
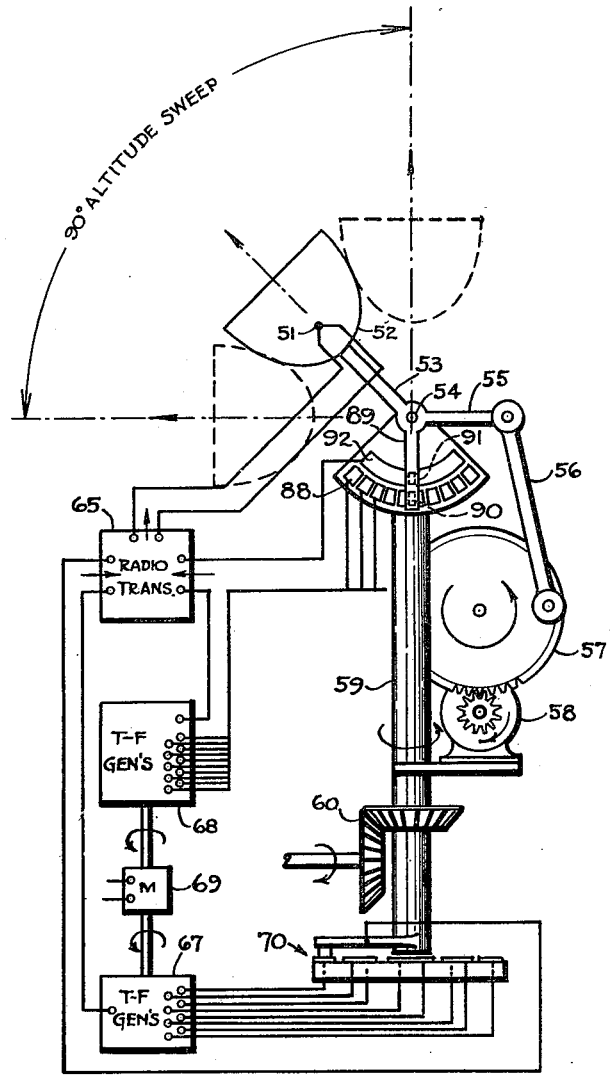
Figure 5 is a schematic showing of a transmitting station having a single beam adapted to sweep and angularly coordinate a solid angle.

Figure 5 is a schematic drawing of a transmitting station having a single beam adapted to sweep and angularly coordinate a solid angle. This is accomplished by rotating the antenna and reflector in two degrees of freedom. That is, the antenna is simultaneously rotated about both horizontal and vertical axes. The antenna 51 and reflector 52, which may be designed to produce a beam having a cross section substantially circular, are carried on an arm 53 which is pivoted at 54 and caused to oscillate through the agency of the rocker arm 55, link 56, rotating eccentric 57, and motor 58. All of the above-named parts are carried on and rotate with the shaft 59. Shaft 59 is rotated through appropriate gearing 60 driven from a suitable prime mover.

Radio transmitter 65 supplies power to antenna 51. Two groups of tone-frequency generators 67 and 68 are driven by a common motor 69. Each group of these generators has a different range of tone-frequencies, and may be constructed in the same manner as those previously described in connection with Figures 1 and 3. The output of the generators 67 is commutated by the assembly 70 and impressed upon the transmitter 65 for the purpose of modulating the output. This commutator assembly may be similar to the one shown in Figure 1. The commutator arm is carried by and rotates with the shaft 59 in the same manner as the arm 9 shown in Figure 1. Thus, for a certain and particular angular motion of the shaft 59 the output of a particular tone-frequency generator will be impressed upon the transmitter and beam. As the shaft 59 continues to rotate each generator of the group will be commutated in turn for a particular position of the beam. The output of the tone-frequency generators 68 is commutated by means of the segments 88 and the arm 89 secured to the crank 55 which arm carries the brushes 90 and 91, brush 91 bearing on the large segment 92 which is connected to the transmitter. Thus for definite positions of the transmitted beam there will be transmitted certain tone frequencies from the generators 68, each frequency being related to a definite position of the beam.

It will be seen that at any given position of the beam there will be impressed upon it two signal frequencies from different generators, and that one frequency, that from one of the generators 67, will be an indication of the beams position about the shaft 59, or an indication of azimuth, and the other frequency, that from one of the generators 68, will be an indication of the beams position about the pivot 54, or an indication of the angle of altitude. Thus, it will be seen that I have designed a single beam which may be made to sweep a solid angle greater or less than a hemisphere and which will at all times indicate at a remote point in the beam by means of its modulation frequencies, or characteristics, its direction of propagation both in azimuth and altitude.

Figure 6:
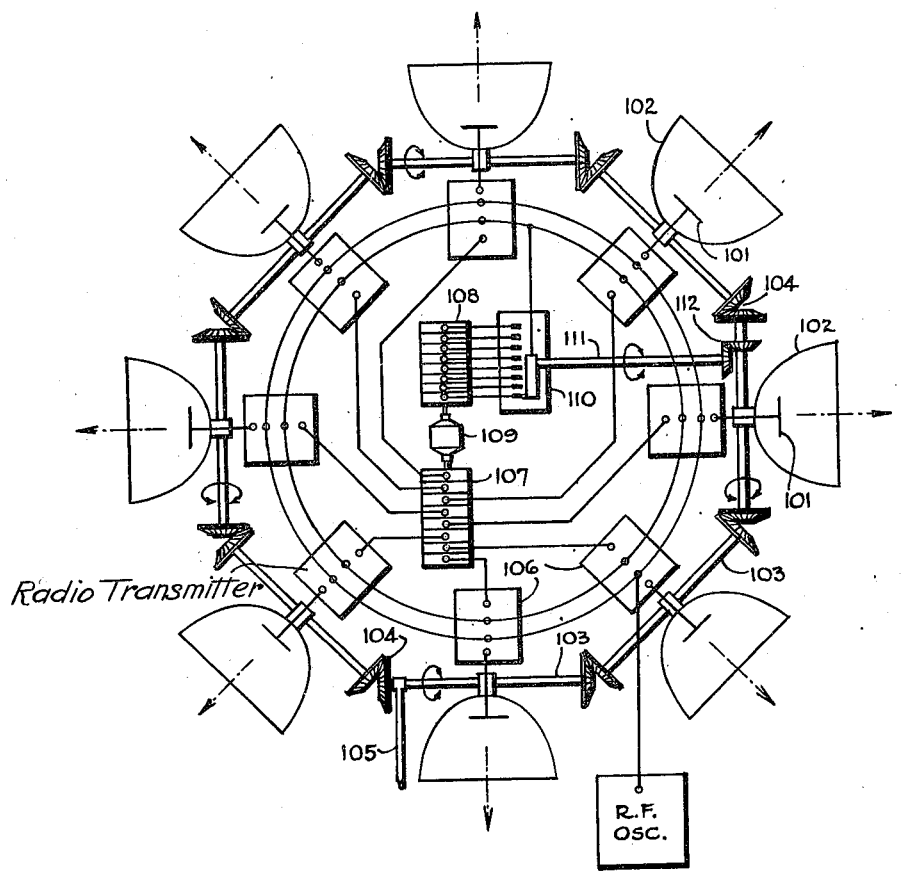
Figure 6 is a modification showing a transmitting station having a plurality of beams which are adapted by cooperating together to sweep and angularly coordinate a solid angle or angles.

Figure 6 is a modification of a transmitting system for sweeping a solid angle. This system differs from that of Figures 3 and 5 in that there is no beam which has rotation about a vertical axis. Instead, there are several beams arranged to radiate outwardly from a common point and which rotate only about axes in a horizontal plane. These directional antennae 101 and their associated reflectors 102 are mounted on shafts 103 which are arranged to form the sides of an octagon and to rotate together by means of the interconnecting bevel gears 104. Oscillation of all of these shafts may be obtained by oscillation of one of them as by movement of the arm 105 which may be moved in the same manner as the arm 55 of Figure 5. Each beam has a major axis which may subtend an angle of 45 degrees. Associated with each antenna is a radio transmitter 106. All of the transmitters may be driven by a common radio frequency oscillator, as shown. Two groups of tone-frequency generators 107 and 108 are driven by a common motor 109. Each group of generators has a different frequency range. These generators may be constructed in the same manner as those previously described. The output of each of the generators 107 is lead directly to a different one of the transmitters 106 which thus gives each of the beams a different and distinctive signal frequency. The output of the group of tone-frequency generators 108 is connected to commutating means 110, similar to parts 88 to 92, inclusive, of Figure 5. The commutating arm is caused to oscillate by connection to one of the shafts 103 through the shaft 111 and gearing 112. The modulating frequency selected by the commutator is simultaneously impressed upon all of the transmitters 106. Thus at any one time each of the beams has a signal from one of the generators 107 which is an indication of azimuth, and a signal from one of the generators 108 which is an indication of the angle of altitude of the beam.

A properly tuned receiving station located at a distant point from either the transmitter of Figure 5 or Figure 6, or Figure 3 if constructed with vertical radiators for 360 degrees of azimuth, will detect two signal frequencies one of which will be an indication of azimuth while the other will be an indication of the angle of altitude, with respect to the transmitting sation. As this receiving station moves about the transmitting station at a fixed distance and in a horizontal plane the signal frequency characteristic of the angle of altitude will remain the same while the signal frequency characteristic of the angle of azimuth will vary as it passes from zone to zone as defined by the different beam characteristics. Similarly when the receiving station moves about the transmitting station at a fixed distance and in a vertical plane the signal characteristic of the angle of altitude will vary while the signal characteristic of the angle of azimuth will remain fixed except when passing beyond the zenith. As the receiver moves with respect to the transmitter the position of the receiver is continuously indicated in both azimuth and altitude.

In the modification of Figure 6 the number of beams may be increased depending upon the number of zones desired; also, in particular installations it may be desirable to cover only portions of a complete azimuth circle. In receiving signals from such a transmitting station, if there is overlap of the beams, more than one signal may be indicated on one of the scales such as the azimuth, but it will be observed from the extent of the swing of the reeds that the amplitude of these signals will differ. The relative intensities of the two signals will be an indication of the relative positions of the receiving station with respect to the two beams carrying the different signals.

Instead of physically rotating the antenna and reflector as has been shown in the various modifications, it is possible to obtain angular motion of a beam by employing an appropriate mode of excitation and various antenna systems such as those employing fixed crossed antenna loops or fixed antenna arrays. In these cases excitation may be obtained by means of a rotating coupling or other phase shifting system. One particular arrangement that may be adapted to accomplish this in a beacon station, is disclosed by H. T. Friis in Patent Number 2,041,600, granted May 19, 1936, and in related patents. This invention is not limited to antenna of a particular type, but may be embodied in any type of fixed antenna elements in which the directional characteristic may be readily changed by varying the phase angle or sequence of the currents supplied to said elements, or by the variation of impedance elements associated with said antennae, whereby the direction of the radiation is varied. It will thus be seen that by actuation of the antenna, or antennae or antenna system, by either rotation thereof or by excitation, the beam is caused to rotate in a desired manner.

In the above-described system modulation has been obtained by specific tone-frequencies or characteristic signals each related to a particular position of the radiated beam. In some installations it may be desirable to have closer definition of angular position, such as would be obtained were the number of different tone-frequency zones increased many fold. This may readily be accomplished by substituting a continuously variable tone-frequency generator in place of the series of generators and commutating means described herein. Where the variable frequency generator is to be employed to modulate a beam periodically sweeping through 360 degrees of arc it would be preferably of the type that will produce a frequency variation with a sawtooth pattern. That is, the frequency would sweep linearly from a value of 200 cycles to 300 cycles while the beam is rotated through one revolution, whereupon it would drop back directly to 200 cycles and repeat throughout each of the following revolutions. It may be stated otherwise, that the characteristic continuously varies as the angular displacement of the beam. Synchronism could readily be had by a cam or contact device actuated by the beam rotating shaft or mechanism such as parts 3 to 10 shown in Figure 1. The variable-frequency generator may be a vacuum tube oscillatory circuit with either or both variable capacitive or variable inductive elements actuated by the driving shaft or mechanism.

These systems enable several beacon transmitting stations to be operated in the same general territory on the same carrier frequency, and with each station having a series of tone-frequency generators whose frequencies are identical with those of each of the other stations. Thus, when the receiving station is at a point within range of two stations and is tuned to the common carrier frequency two of the reeds on one of the scales will be actuated to indicate the direction of the two stations; thus giving a triangulation upon these stations, and a determination of the angular location and the distance of the receiving station from the two transmitting stations, or the rectangular coordinates.

The above described systems may be further modified to permit identification of the various stations in a group using the same carrier frequency by giving each transmitting station a distinctive tone-frequency band, and by providing the receiving station with two indicators each adapted to cover one of the transmitted tone-frequency bands. The indicator for such a receiving system might be similar to the one shown in Figure 4 with the addition of one or more concentric rings, or groups, of reeds 44. Each group of reeds being responsive only to the frequencies transmitted by one of the stations. If signals are being received simultaneously from two stations and shown on such an indicator, the indicator may be placed on a map of the district and so located on the map that lines drawn from the center of the indicator through the two reeds that are in vibration, will intersect the two stations. When so located, the center of the indicator will be over the place on the map corresponding to the location of the receiver. Such a device makes easy at all times the determination of the position of the receiver.

With a device such as described herein, mobile craft may readily and simply determine their direction and location with respect to a beacon transmitting station. With a device of the type described the position may be determined without the necessity of maintaining a fixed course while obtaining bearings as is necessary with a manually operated loop type or similar direction finders. With reeds of the type shown in combination with headphones or an ordinary loud speaker, it is a simple matter to provide both visible and audible indications of the direction.

The system described herein may be intentionally adjusted so that the sequence of the different tone frequencies used to modulate the transmitted beam as it is rotated through various positions, may be altered by a change in the order of commutation by the commutator. By predetermined arrangement, the sequence of the reeds in the visual indicator at the receiver would be similarly arranged so that the correct direction reading would be obtainable. By scrambling the order of frequencies transmitted, it would be extremely difficult if not impossible for unauthorized receiving stations to avail themselves of the directional beacon.

These systems will enable a mobile craft to obtain bearings on a beacon station by the use of an ordinary radio receiver in conjunction with a simple reed indicator. This system obviates the use of cumbersome directional antenna and the manipulation by the operator of such antenna. A further advantage is the elimination of the necessity for consideration of field distortion in the immediate vicinity of the receiver.

In the present system any number of courses may be established from a given beacon whereas in the prior art the number has been limited.

The use of tuned reeds in receivers for identifying beam tone-frequencies is not new, as will be found by reference to Department of Commerce Research Papers Numbers 28, 148, and 154, but in the systems described therein it is not possible to obtain bearings on a beacon station from all points on the azimuth circle. Neither can angles of altitude be obtained at any point.

The systems operating on the well-known A-N principle with overlapping equisignal zones, are effective only as specific course markers, although at the same time they transmit signals throughout the entire azimuth circle of 360 degrees. As only a small portion of the transmitted power can be effectively utilized the efficiency of such a system as a whole appears to be very low. The unuseful power creates interference with other stations operated on the same carrier frequency. In contrast to this, the present system will serve effectively in all directions, if so desired, while radiating in only one direction at a time.

It may be readily understood that the rotating or revolving beams need not cover the full 360 degrees of arc. It is a simple matter to interrupt the modulation or carrier throughout certain sectors and confine the radiations to certain arcs of rotation which it is desired to cover. This will effectively reduce the interference that is now experienced where broadcast type of radiators are employed, and at the same time raise the efficiency.

Having thus described my invention, I claim:

1. In a radio beacon direction finding system: a radio transmitter having a beam radiator, means for revolving said radiator so that the beam therefrom will sweep in two degrees of freedom, and said transmitter having means for transmitting two repeating series of varying signals, each series differing from the other, and the character of each signal of each of said series of signals indicating at the time of its transmission a coordinate at that time of the locus of a beam from said radiator, as it sweeps in two degrees of freedom.

2. In a radio beacon direction finding system: beam antennae, means for actuating said antennae so that each of the beams therefrom will periodically sweep a different desired angle, a radio transmitter associated with each of said antennae, said transmitter adapted to produce a carrier frequency, means for modulating the carrier frequency of each transmitter with a different tone-frequency, and means for additionally modulating the carrier frequency of each of said transmitters by a particular tone-frequency as each of said antennae periodically passes through a particular position.

3. In a beam direction finding system: a radio transmitter adapted to produce a carrier frequency and having a beam radiator, means for actuating said radiator so that the beam therefrom will sweep through a desired course, means for impressing upon said transmitter a signal adapted to modulate the carrier produced by said transmitter, which signal will at all times be related to and indicative of one coordinate of any one position, and operative simultaneously with said first means a second means for impressing upon said transmitter a signal adapted to modulate the carrier produced by said transmitter, which signal will at all times be related to and indicative of a second coordinate of said position of a beam.

CHARLES E. WILLIAMS.